June 14, 1960 E. K. PLANT 2,940,541
METHOD OF PURIFYING GASES
Filed Oct. 15, 1956
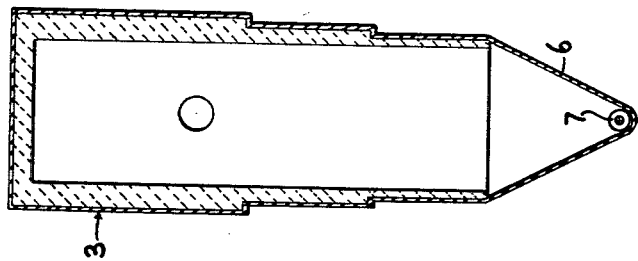
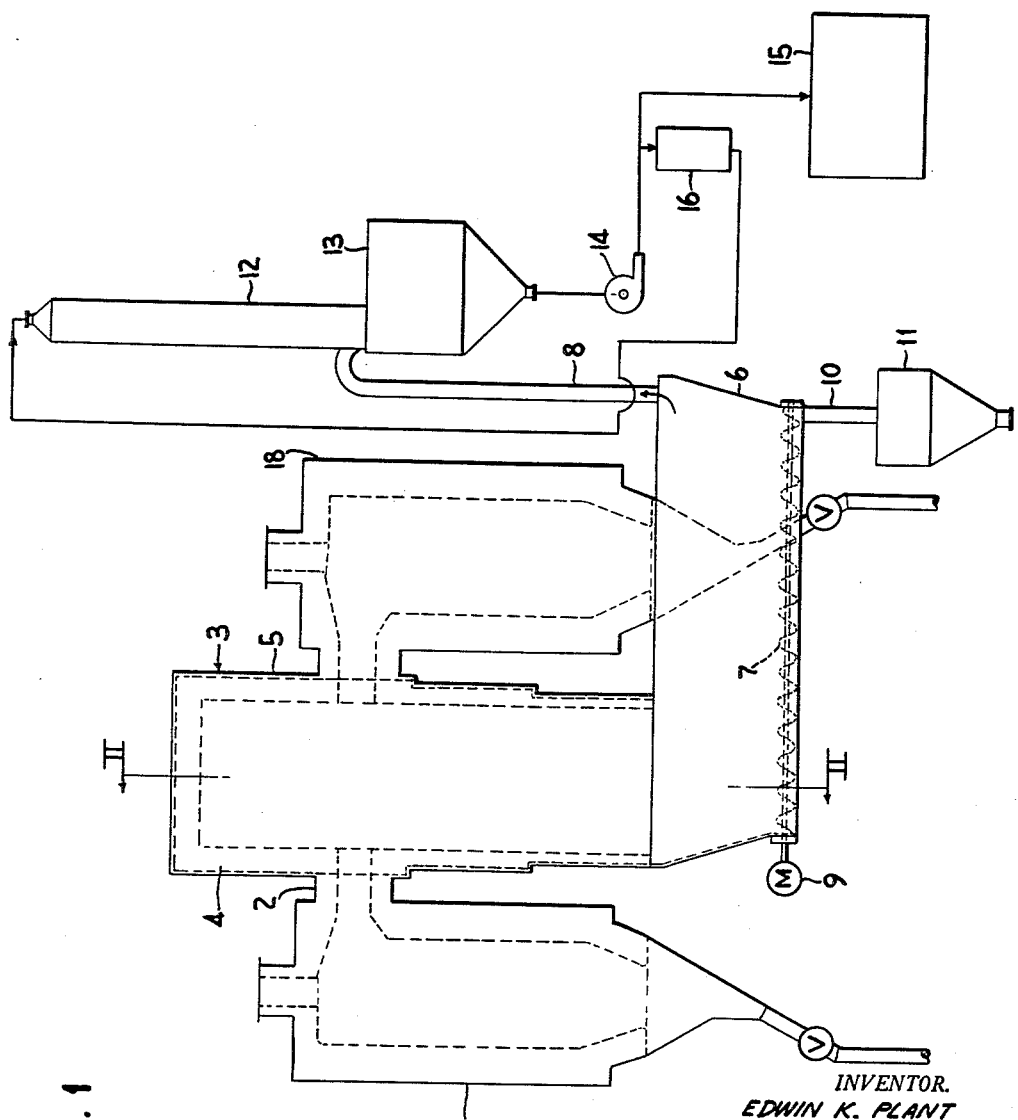
INVENTOR.
EDWIN K. PLANT
BY
Oscar L. Spencer
ATTORNEY

United States Patent Office 2,940,541
Patented June 14, 1960

2,940,541

METHOD OF PURIFYING GASES

Edwin K. Plant, Pittsburgh, Pa., assignor to Columbia-Southern Chemical Corporation, Allegheny County, Pa., a corporation of Delaware Filed Oct. 15, 1956, Ser. No. 616,102

8 Claims. (Cl. 183—119)

The present invention relates to a method of purifying gases or vapors. In a particular embodiment the present invention involves the removal of iron chloride from a gaseous mixture thereof.

When, for instance, a titaniferous iron ore is chlorinated at high temperatures in the presence of carbon, an effluent gas comprising titanium tetrachloride and iron chloride is given off from the reactor. When ilmenite, for example, is the ore being treated, a substantial quantity of ferric chloride is present in the effluent gas. Numerous methods have been attempted to separate the ferric chloride from the titanium tetrachloride, but in each of these methods severe coating of the surfaces of the apparatus used has occurred, thus seriously hindering the process and causing excessive losses.

For example, where a gaseous mixture containing ferric chloride and titanium tetrachloride is to be cooled and separated into its components, ferric chloride, which separates out as a solid upon condensation, deposits on the apparatus surfaces and cakes them, thus disrupting the efficiency of the apparatus and upsetting proper heat transfer. If, for instance, a bank of tubes having a cooling fluid running therethrough is used in heat exchange with the gaseous mixture, solid ferric chloride deposits on the tube surfaces and forms an insulatory coating thereon which, after a short period of time, substantially negates their effect as a coolant.

Where gaseous mixtures of the type just mentioned are admixed with an inert cooling gas to effect condensation of the ferric chloride constituent, a gaseous effluent containing a substantial amount of inert gas results and complicates the procedure by requiring that cumbersome and expensive apparatus be used to handle the extra volume of gas.

According to the present invention the difficulties hereinabove mentioned are overcome. Hot effluent gases derived from a titanium tetrachloride-forming furnace, for example, and containing substantial amounts of ferric chloride, are first cooled in a primary cooler or series of coolers to a temperature at which ferric chloride condenses. For this purpose, a brick-lined vertical cooler or condenser having a gas-tight shell of nickel or nickel-steel alloy, or the like, affords exceptional results. The brick lining is best tapered in such a fashion that the hot gases entering the condenser are in close proximity with the thickest portion of the lining and, as the gases travel through the condenser, they are in close proximity with a gradually thinning lining.

For example, a vertical condenser, according to the instant invention, receiving hot furnace gases in the upper portion thereof, which gases then flow downwardly through the condenser, is best heavily lined in the top portion thereof, the lining becoming gradually thinner toward the bottom. Such a system permits controlled radiation of heat through the walls of the cooler.

Furthermore, the condenser, as will be seen hereinafter, is so constructed that sufficient heat from the gaseous mixture radiates through its walls to condense vaporous ferric chloride to its solid state. One of the exceptional features of this condenser is that it permits gradual radiant cooling with a minimum of coating being formed on the interior surfaces of the condenser. This is a significant contribution to an art hitherto crippled by such caking and coating.

The partially-cooled gaseous mixture containing iron chloride solids then passes to a zone of relatively large cross-sectional area, such as a settling box, where ferric chloride solids selectively settle out. Conditions of temperature and velocity are maintained within the settling box such as to allow the ferric chloride particulates to fall freely, as it were, to the bottom of the box without any substantial adhesion of the particulates to the inner wall surfaces of the box and without their being entrained by the gaseous titanium tetrachloride leaving the box. The titanium tetrachloride effluent is thus rendered substantially free from ferric chloride.

These results are best realized by maintaining the temperature of the mixture and that of the inner surfaces of the settling box walls at approximately the same temperature. By this isothermal system, caking or coating of the inner surfaces with ferric chloride condensate is substantially prevented. Thus, the mixture traveling through the settling zone may be conveniently maintained at an average temperature of about 250° F. and the walls of the zone at approximately the same temperature. If, for instance, the mixture enters the zone or box at about 300° F. and the gas emanating from the box is at about 200° F., the average inner wall temperature should then be maintained at about 250° F. Latent heat which escapes from the gaseous mixture does so by radiation through the walls of the zone. Obviously, too much heat radiation would cause condensation of titanium tetrachloride and, thus, upset the desirable selectivity of the process. Also, too great a gas velocity through the system would cause entrainment of ferric chloride solids by the rapidly exiting titanium tetrachloride gas.

According to a particular embodiment of the present invention, the lower portion of a vertical condenser of the type just described empties directly into the top portion of one end of a settling box, the gases flowing through the box at a velocity and temperature such that the iron chloride solids formed in the condenser fall freely to the bottom of the settling box, from whence they are removed by a suitable means, such as a screw conveyor.

As the gaseous mixture travels through the zone, some cooling takes place, as defined above, by liberation of latent heat; also, by controlling the velocity and residence time of the gases in the cooling system, iron chloride solids having a specific minimum particle size may be formed and made to fall freely to the bottom of the settling zone, thus selectively ridding the mixture of iron chloride and providing an effluent from the settling zone substantially free of iron chloride.

The process of the present invention is best practiced by providing a quiescent settling zone or gas space to permit efficient precipitation of iron chloride solids. A turbulent zone would tend to interrupt the free fall of solids and also disrupt the temperature equilibrium existing between the gaseous mixture and the internal surfaces of the zone by causing severe coating on these surfaces and preventing efficient liberation of latent heat.

As stated hereinabove, it is an important feature of the present invention that a method of selectively removing iron chloride, or the like, from a gaseous mixture thereof has been discovered which provides continuous precipitation of the condensate substantially without caking and coating of the apparatus. Time and profit loss as a result of hitherto practiced methods of removing iron chlorides from gaseous vapors containing them have been very significantly minimized.

In the drawing, Figure 1 is a diagrammatic side elevation of a preferred embodiment of the present invention.

Figure 2 is a vertical section along line II—II of the condenser and settling box.

Figure 1 is a preferred embodiment showing a shaft furnace 1 in which, for instance, ilmenite ore in the form of ore-coke briquettes is chlorinated by passing gaseous chlorine upwardly through the furnace 1 and, thus, through a body of the briquettes contained therein. The resulting chlorinated gases pass through outlet 2 leading into cooling unit 3, which comprises a vertical chamber having tapered (brick) lining 4 and a metal shell 5 through which heat from the gases introduced therein radiates. As stated hereinabove, hot gases from the furnace enter the cooling chamber 3 at the point in the chamber having the thickest lining. In the present case, the gases enter chamber 3 at the top thereof where the lining 4 is the thickest.

The process of the present invention is particularly efficacious when using a theoretical excess of chlorine gas to chlorinate the titanium ore, thus permitting free $Cl_2$ to be present in the chlorinated effluent gases. Furthermore, the process of the present invention is not restricted to the static, briquette bed operation just defined, since it may be employed in fluid bed chlorination processes, moving bed processes, and the like.

The lower portion of cooling unit 3, according to the instant embodiment, opens into collecting box or gravitational settling box 6 having screw conveyor 7 on the bottom thereof and outlet 8 leading therefrom. Screw conveyor 7 is driven by motor 9 and feeds into outlet 10 which empties into storage tank 11. Outlet 8 is connected to spray cooler 12, which, in turn, is directly attached to condensate collecting tank 13. Pump 14 links receiving tank 13 and storage tank 15; it also links receiving tank 13 and spray cooler 12 through liquid $TiCl_4$ cooler 16.

Figure 1 further shows an additional furnace 18 which is optional.

Figure 2 is a vertical section along line II—II of Figure 1. This figure discloses how the sides of collecting box 6 are best converged to form a trough containing conveyor 7.

In the operation of a particular embodiment of the present invention, hot gases obtained by chlorination of the ilmenite ore-carbon briquettes above defined at an elevated temperature, said gases comprising titanium tetrachloride and ferric chloride, are introduced into cooler 3 from furnace 1 via outlet 2. These gases at a temperature between about 1600° F. and 1800° F., usually about 1750° F., as they enter the cooler 3, pass upwardly toward the top of the cooler and then downwardly therethrough. In so doing, as will be seen hereinafter, they radiate heat through the walls thereof, thus gradually and efficiently being cooled until ferric chloride solids are formed.

The resulting gas-solid mixture enters collecting box 6 at a temperature of about 300° F. As the mixture passes horizontally through the box, ferric chloride solids settle out and are removed via conveyor 7 and outlet 10 to storage tank 11.

Titanium tetrachloride gas having a temperature between about 200° F. and 250° F. emanates from collecting box 6 through outlet 8 and passes to spray cooler 12, where it is condensed by means of a cool spray of liquid titanium tetrachloride. $TiCl_4$ condensate thus formed is collected in receiving tank 13 and the bulk of it is transferred by means of pump 14 to storage tank 15. Part of the liquid condensate from tank 13 is returned to the top of spray cooler 12 (as shown), where it serves as the spray coolant described above, the condensate being first cooled in cooler 16.

Cooling chamber 3 referred to above is a relatively long vertical chamber having a shell of metal, such as steel, nickel and the like, and having a lining of refractory material, such as insulatory firebrick. The lining is thickest in the top portion of the chamber and gradually diminishes in thickness toward the bottom, thus permitting varying degression of heat radiation through the walls of the chamber as the gaseous mixture passes therethrough.

The degree of radiation is so regulated as to permit gradual cooling of the gaseous mixture passing through the chamber without any significant coating of the inner surfaces of the chamber, such as is typical of cold-wall cooling techniques hitherto known.

When the gaseous mixture entering the chamber comprises titanium tetrachloride and ferric chloride at a temperature of about 1750° F., heat radiation should be such as to permit a mixture comprising $TiCl_4$ gas and $FeCl_3$ solids to leave the chamber at a temperature of about 250° F. to 350° F., preferably about 300° F. At lower temperatures, $TiCl_4$ tends to condense to a liquid state and form a sludge on the interior walls.

From the cooling chamber 3, the gas-solid mixture passes directly into collecting box 6, usually made of metal, such as steel, although any metal capable of withstanding the temperature and corrosive conditions of the present process is suitable. In passing through box 6, the mixture sheds $FeCl_3$ solids which fall freely to the bottom of the box and are removed by any suitable means, such as a screw conveyor 7.

Since, as disclosed hereinabove, the gas-solid mixture is best introduced into the settling or collecting box 6 at a temperature of about 300° F., in the case where a mixture comprising $TiCl_4$ gases and $FeCl_3$ solids is concerned, and the $TiCl_4$ gases removed from the box are between about 250° F. and 200° F., the average temperature throughout the box is about 250° F. It has been found, according to the present invention, that by maintaining an isothermal system, i.e., by maintaining the interior surfaces of the collecting unit as well as the gases therein at an average temperature of about 250° F., caking or coating of the interior surfaces of the unit is substantially eliminated and an efficient system results.

Obviously, since flexibility is at times needed in a continuous system, it may be desirable to jacket the collecting unit to afford ready control of the temperature thereof and in that way maintain the isothermal system herein defined. A jacket placed about the unit may be employed for that purpose and temperature controlled by passing steam or water therethrough, for example, at a predetermined temperature.

What latent heat is lost from the mixture in transit through box 6 radiates through the walls thereof and condensation of the gases on the interior surfaces is thus very significantly reduced.

Eddy currents which tend to form in the settling box 6 may be adequately minimized by hanging chains or the like in the path of the moving body of gas, thus maintaining a relatively steady linear flow of gas through the box.

The following is an example of a particularly desirable embodiment of the present invention:

Example I

Into brick-lined cooler 3, 48.8 moles of gas per hour is fed from furnace 1, the gas being at a temperature of 1750° F. and having the following components in approximately the proportions given:

| | Moles per hour |
|---|---|
| $TiCl_4$ | 7.4 |
| $FeCl_3$ | 4.9 |
| $CO+CO_2$ (as carbon) | 18.8 |
| $Cl_2$ | 16.0 |
| Air | 1.7 |
| Total | 48.8 |

Cooler 3 is fed via furnace outlet 2 which opens into the upper portion of the cooler, the gas passing first upwardly through the cooler and then traveling downwardly toward collecting box 6.

The cooler is cylindrical, measures 32 feet in height and is made up of three sections. The first section or upper third is twelve feet high, measures 9 feet in average diameter, has a one-foot thickness of brick (K=0.65), and an area of 340 square feet. The second section or middle third of the cooler 3 is ten feet high, measures 8.5 feet in average diameter, has a six-inch thickness of brick (K=0.65), and an area of 267 square feet. The third section or lower third is ten feet high, measures 8.2 feet in average diameter, has a 3.5-inch thickness of brick (K=0.65), and an area of 257.7 square feet. The shell 5 of cooler 3 is made of one-half inch nickel clad steel. Since the coefficient of heat conductivity (K) is the same for all three sections, and since the heat transmitting resistance of the wall is directly proportional to wall thickness, obviously the wall of the cooler diminishes in heat transmitting resistance from the top to the bottom of the cooler in the direction followed by the gases.

At a relatively constant temperature of 325° F. along the outside wall of cooler 3, the heat loss in section one of the cooler 3 is about 259,000 B.t.u., thus cooling the gaseous mixture to 1160° F. In section two, the heat loss is about 199,000 B.t.u. and the temperature of the gas as it leaves this section is 616° F. As the gas passes through section three, a quantity of heat equivalent to 115,000 B.t.u. is given up and the gas temperature reduced to 300° F. At this temperature the gaseous mixture comprises gaseous $TiCl_4$ and $FeCl_3$ solids.

In a settling box 6 of the type depicted in Figure 1, the box being 15 feet wide, 30 feet long and 10 feet high and having a triangular cross-sectional area of 75 square feet, this mixture of $TiCl_4$ gas and $FeCl_3$ solids is introduced. The box is made of 10 gauge steel and is covered on all sides with magnesia block insulation (K=0.04) having a 4-inch thickness. At the bottom of the box is a screw conveyor running the length thereof. The diameter of the screw is 12 inches and it is motor-driven at the rate of about 15 revolutions per minute.

The gaseous mixture flows through the box at a rate of about 6.33 cubic feet per second; hence, the average velocity of the gas in the box is about 0.0844 feet per second. The temperature of the gas entering and leaving the box is about 300° F. and 200° F., respectively. Operating at the average inside wall temperature stated above (about 250° F.) and simultaneously at an outside wall temperature of about 60° F., the heat loss is about 22.8 B.t.u. per hour per square foot, computed as follows:

$$\frac{q}{A} = \frac{\Delta t}{\frac{L}{k}} = \frac{250-60}{\frac{.33}{.04}} = 22.8 \text{ B.t.u./hr./sq. ft.}$$

The total surface area of the box is:

| | Square feet |
|---|---|
| Sides 2 x 12.5 x 30 | 750 |
| Top 1 x 15 x 30 | 450 |
| Ends 2 x .5 x 15 x 10 | 150 |
| Total surface area | 1350 |

Hence, the total heat loss is 22.8 x 1350 or 30,700 B.t.u. per hour. At this rate of loss the 43.0 moles of gas (i.e., 48.8 moles fed into the box minus the 4.9 moles of $FeCl_3$ removed therefrom) leaving the box is at a temperature of about 200° C.

Since a certain amount of the solids may adhere to the inner walls of cooler 3, it is within the contemplation of the present invention (as stated hereinabove) to provide a control exterior to and adjacent the box, such as a jacket. This provides flexibility to the process, since the jacket may be used for heating or cooling, as the case requires.

$FeCl_3$ solids formed as shown above settle to the bottom of the box, the smallest solid particles being about 10 microns in diameter. $TiCl_4$ gas containing a very small amount of $FeCl_3$ solids is removed from the box and conducted to a spray cooler where it is condensed to liquid $TiCl_4$ by the process previously defined.

The diameter of the smallest particle is determined as follows:

The rate of fall of a spherical particle, such as $FeCl_3$, in still air is computed from the following formula:

$$u = \frac{D^2 \rho_s}{10^4}$$

The density of $FeCl_3$ is 2.8.

If $u$ is the actual settling rate in feet per second of the smallest particle to be collected, Q the gas flow in cubic feet per second, Ac the cross-sectional area in square feet, and L and H the length and height in feet, respectively, of the settling chamber, then obviously the dimensions of the chamber are such that $$LA\ u = HQ$$

Substituting for $u$ in the latter formula the valve given in the former formula, the particle size (D) in microns of the $FeCl_3$ solids settling in box 6 can be computed as follows:

$$D^2 = \frac{QH \times 10^4}{LAc\rho_s} = \frac{6.33 \times 10 \times 10^4}{30 \times 75 \times 2.8} = 100.5 \text{ microns}$$

$D$=about 10.0 microns, the diameter of the smallest particle size collected.

Eddy currents which tend to affect the particle size just computed can be minimized by hanging chains, or the like, in the settling box.

The cross sectional area of the settling box should not be of such magnitude as to upset the isothermal system hereinabove defined. For instance, too sharp a reduction of the gas velocity brought about by a large cross sectional area could increase the residence time of the body of gas in the settling box to such a degree that the isothermal system herein defined would be impossible of maintenance.

It is evident from the foregoing that numerous modifications within the skill of a chemical engineer may be applied to the present process without transcending the scope of the invention. It is also evident that gaseous mixtures containing other than iron chloride solids may be treated as herein defined. For example, a zirconium tetrachloride-containing mixture may be liberated of its $ZrCl_4$ content by the process of the instant invention, the $ZrCl_4$ having been produced from a zirconium-bearing ore in a system such as that shown herein. Zirconium tetrachloride condenses from a vapor to a solid in the same manner as ferric chloride. The temperature of the gases entering the cooling system of the present invention and containing $ZrCl_4$ would vary, depending upon the type zirconium-bearing material being treated. For instance, zirconium carbide or zirconium carbonitride can be chlorinated at temperatures between about 650° F. and 750° F. and zirconium oxide between about 750° F. and 1650° F.

While the instant invention has been described with particularity as to certain embodiments thereof, it is not intended that the scope of the invention be so limited, except insofar as particularly defined in the appended claims.

I claim:

1. A method which comprises cooling a gaseous mixture containing iron chloride vapors by passing the mixture through an elongated zone having walls capable of transmitting heat, which walls diminish in heat transmitting resistance in the direction followed by the mixture through said zone, gradually cooling said mixture in said zone to the point where the iron chloride is in solid state and a gas-solids mixture results, introducing said gas-solids mixture into a relatively large, quiescent gas space having walls, passing said mixture through the space at a rate of flow at which substantially all of the solid iron chloride component selectively settles out, maintaining the temperature of the gaseous mixture, the gas space and the inner surfaces of the walls opposite said flowing mixture substantially uniform and above the temperature at which any substantial condensation of the gaseous component of said mixture takes place, and removing said gaseous component substantially free from iron chloride.

2. The process of claim 1 wherein sufficient residence time of said gas-solids mixture in said space is provided to permit iron chloride solids having a particle size of at least 10 microns to settle out.

3. The process of claim 1 wherein the iron chloride is selectively removed from a gaseous mixture of titanium tetrachloride vapors and iron chloride vapors.

4. The process of claim 3 wherein sufficient residence time of said gas-solids mixture in said space is provided to permit ferric chloride solids having a particle size of at least 10 microns to settle out.

5. A method which comprises cooling a gaseous mixture containing iron chloride vapors by passing the mixture through an elongated zone having walls capable of transmitting heat, which walls diminish in heat transmitting resistance in a direction followed by the mixture through said zone, gradually cooling said mixture in said zone to the point where the iron chloride is in solid state and a gas-solids mixture results, and separating the solid iron chloride from the mixture.

6. The method of claim 5 wherein the gaseous mixture enters an upper portion of said zone and flows downwardly therethrough to a lower portion thereof, the gas-solids mixture formed is a gaseous suspension of solid iron chloride particles, and the walls of the zone diminish in thickness from said upper portion to said lower portion.

7. The method of claim 6 wherein the gaseous mixture is gradually cooled as it flows downwardly through said zone by transmission of heat from the gaseous mixture through said walls.

8. The method of claim 7 wherein the gaseous mixture comprises iron chloride and titanium tetrachloride vapors.

References Cited in the file of this patent

UNITED STATES PATENTS

| | | |
|---|---|---|
| 2,245,077 | Muskat et al. | June 10, 1941 |
| 2,245,358 | Pechukas | June 10, 1941 |
| 2,311,466 | Pechukas | Feb. 16, 1943 |
| 2,420,373 | Hogberg | May 13, 1947 |
| 2,675,890 | Frey et al. | Apr. 20, 1954 |

UNITED STATES PATENT OFFICE
CERTIFICATION OF CORRECTION

Patent No. 2,940,541              June 14, 1960

Edwin K. Plant

It is hereby certified that error appears in the above numbered patent requiring correction and that the said Letters Patent should read as corrected below.

Column 5, line 33, for "In" read -- Into --; column 6, line 21, for "LA u=HQ" read -- LAcu=HQ --; line 23, for "valve" read -- value --.

Signed and sealed this 25th day of April 1961.

(SEAL)
Attest:

ERNEST W. SWIDER
Attesting Officer

DAVID L. LADD
Commissioner of Patents